March 16, 1965 W. N. WILCOX 3,173,646
SOLENOID ACTUATOR
Filed Sept. 20, 1961
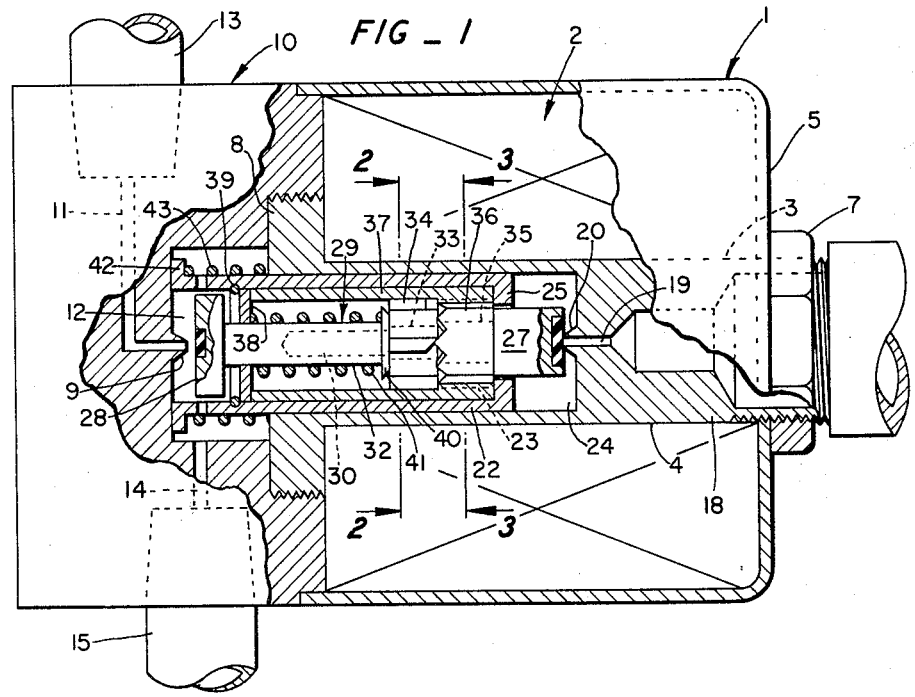
FIG_1
FIG_2
FIG_3
FIG_4
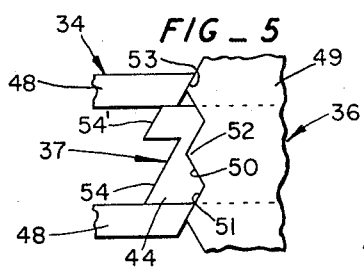
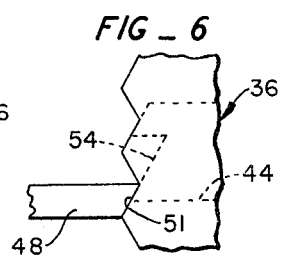
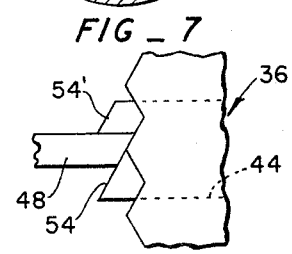
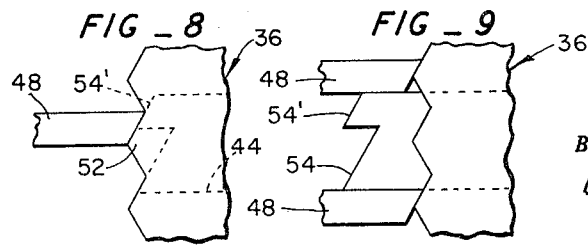
*INVENTOR.*
WARREN N. WILCOX
BY
Boyken, Mahler + Wood
ATTORNEYS

United States Patent Office 3,173,646
Patented Mar. 16, 1965

3,173,646
SOLENOID ACTUATOR
Warren N. Wilcox, 16736 Foothill Blvd.,
San Leandro, Calif.
Filed Sept. 20, 1961, Ser. No. 139,405
7 Claims. (Cl. 251—138)

This invention relates to a solenoid actuator generally, and more specifically to a solenoid actuated valve of the type used in connection with machine tools, cylinder control, instrumentation and automation of all kinds, heaters, refrigerators, laundry equipment, aircraft, missiles, etc. Normally each valve includes an electrical coil and a plunger or core that is reciprocable within the coil between two positions, in one of which the coil is energized and in the other of which it is deenergized.

The plunger or core is of electro-magnetic material that is usually operatively associated with a spring urged valve element for seating such element against a valve seat when the coil is deenergized, and for movement away from the valve seat when the plunger is deenergized, or vice versa. In some instances the plunger may be moved in both directions electro-magnetically, and more than one valve element may be involved.

Heretofore the energized coil has been depended upon for moving and for holding the plunger in at least one of two positions, with the result that a failure in current to the coil will cause the plunger to be prematurely released. Such premature release has, in many instances, resulted in serious damage and loss, and the jeopardizing of lives. Furthermore, the expense of maintaining the coil energized for relatively long periods of time, as has heretofore been usual, is costly.

It is an object of this invention to incorporate a simple, reliable, economically made, compact mechanical means in a solenoid actuated valve assembly that will be actuatable upon momentary successive closings of the electrical circuit to the coil of the solenoid for movement of at least one valve element to an open position alternately with movement of the valve element to a closed position, and which valve element will be mechanically held in said open and closed positions independently of the electrical circuit. Hence it will be seen that a failure in current to the coil of the solenoid will not release the valve element, nor is its circuit being used to hold the valve in said open and/or closed positions.

Another object of the invention is the provision of a plunger of magnetic material in a solenoid, which plunger includes mechanical means automatically actuated upon movement of the plunger to its position within the coil under the influence of the magnetic field of said coil, when the latter is energized, for mechanically holding said plunger within said coil when the coil is deenergized, and which means is automatically actuatable for release from its held position within said coil upon a subsequent momentary energizing of said coil, so that the plunger will be mechanically held within the core upon alternately momentarily energizing the coil, and upon the intervening energizing of said coil the plunger will be released and returned to its normal position when the coil is deenergized.

Other objects and advantages will appear in the description and drawings.

In the drawings:

FIG. 1 is an enlarged, view, partly in section and partly in elevation, taken through a solenoid valve assembly.

FIG. 2 is an enlarged cross sectional view of one of the elements within the assembly taken along line 2—2 of FIG. 1.

FIG. 3 is an enlarged cross sectional view of one of the elements within the assembly taken along line 3—3 of FIG. 1.

FIG. 4 is an enlarged cross sectional view of one of the elements of FIG. 3 shown inside the liner of the movable cylinder, as seen along line 3—3 of FIG. 1.

FIGS. 5, 6, 7, 8 and 9 are semidiagrammatic views showing the successive movements of the mechanical core controlling elements for opening and closing two valves associated therewith upon two successive momentary closings of the solenoid.

In detail, referring to FIG. 1, a housing generally designated 1, houses a solenoid coil 2 having a central passageway 3 therein, within which passageway is a sleeve, generally designated 4.

The housing 1 is provided with a head 5 at one end thereof, which head is formed with a central opening through which one end of sleeve 4 projects, and a nut at the outside head 5 is threaded on said projecting end.

The end of sleeve 4 opposite to head 5 is formed with a radially outwardly projecting flange 8 that extends over the axially outwardly facing end surface of the coil 2 at one end of the latter. The outer peripheral surface of flange 8 is threaded for threadedly engaging the inner threaded surface of a counterbore formed in one side of a valve block, generally designated 10, and which counterbore is in the outwardly opening end of a recess 12.

In the example shown, the valve block may be cylindrical and rabbetted along its outer corner to receive the marginal portion of housing 1 in the rabbet when the flange 8 is threadedly secured to the block and nut 7 is tightened. By this structure the nut 7 will releasably hold the housing, sleeve 4 and valve block 10 rigidly together and stationary relative to each other.

Valve block 10, in the illustrated form, has a duct or passageway 11 opening into recess 12 and an annular elevated valve seat 9 in the bottom of the recess 12 is coaxial with the sleeve 4, and projects toward the latter. The other open end of passageway 11 may connect with a fluid pressure line 13.

A second passageway 14 in block 10 communicates at one end with the recess 12 at a side of the latter and the other end may connect with a fluid line 15 leading to a burner or to any other desired place for delivery of fluid from line 13.

The end of sleeve 4 opposite to the valve block 10 may be formed with a head 18 having a passageway 19 therethrough that is coaxial with said sleeve, and said head may have an annular raised valve seat 20 around the end of passageway 19 that opens into the sleeve.

Reciprocable within the sleeve 4 is the core assembly that also carries the valve elements for seats 9 and 20.

This core assembly comprises a cylinder 22 that is reciprocable within sleeve 4, and which cylinder may have a flute 23 along one side to form a fluid passageway between the recess 12 and space 24 around seat 20 at the opposite end of sleeve 4.

The end of cylinder 22 that is adjacent to head 18 of sleeve 4 is formed with a head 25 that, in turn, is apertured for reciprocable movement therethrough of a valve element 27. Said valve element 27 is on one end of a rod, generally designated 29, which rod carries a valve element 28 at its opposite end. These elements have axially outwardly facing seals that are adapted to alternately seat against the valve seats 20, 9 upon reciprocable movement of the rod 29.

Said rod 29 may be made in two parts, one of which is formed with a reduced diameter externally threaded end portion 30 that is rigid with the valve element 27, and coaxial therewith, which end portion extends into and is threadedly connected with the other part 32 of rod 29.

The section of rod 29 between the threaded portion 30 and the valve element 27 is of successively larger diameter from said threaded portion 30 to said valve element 27.

On the part 32 of rod 29 and adjacent to valve element 28 is a washer 38 held against movement toward said valve element by a split lock ring 39, and reacting between washer 38 and a tapered bearing washer 40 is a coil spring 41, the latter bearing against a first cam member 34 to continuously yieldably urge said first cam member 34 toward cam member 36. Washer 40 is rotatably, reciprocally received on part 32 of rod 29.

Ring 39 functions both as a backing for washer 38 and locks the plunger assembly together.

A section 33 on the rod 29 adjoins the threaded portion 30 and supports a first cam member 34 for rotation and reciprocation thereon, while a section 35 between section 33 and the valve element 27 has a second cam member 36 rigid therewith. These cam members may be of a plastic material such as nylon.

The section 35 of rod 29 is preferably of larger diameter than section 33, and valve element 27 may be of slightly larger diameter than section 35.

Secured within the cylinder 22 and around the cam members 34, 36 is a liner 37 preferably of metal, that includes cam surfaces that later will be described in more detail, as will members 34, 36.

The cylinder 22 has a radially outwardly projecting flange 42 at the end thereof within the recess 12 in the valve block 10 and a coil spring 43 reacts between said flange 42 and the head 8 that is rigid with sleeve 4.

The cam members 34, 36 and cam surfaces on liner 37 function as control means to effect alternate seating of the valve elements 27, 28 against the seats 20, 9 upon successive momentary energizing of the coil 2, and to insure said elements remaining seated after each energization of coil 2.

As seen in FIG. 1 the cylinder 22 and the rod 29 carrying the valve elements are reciprocable relative to each other and relative to the outer sleeve 4, but the latter is stationary.

At this point, the manner of operation of the device may be explained without reference to the specific structural details that effect the desired operation, since the structural details are subject to modifications, there being a number of possible variations.

Referring to FIG. 1, upon energizing coil 2, the plunger 22 is electro-magnetically actuated to move to the right relative to the rod 29 that carries the valve elements, and relative to the sleeve 4, and when so moved, it connects with rod 29 so that movement of the plunger to the left will carry the rod 29 and the valve elements 27, 28 with it as a unit, and the element 28 will be in a position to engage seat 9. Also spring 41 will be compressed. Whether movement to the left is under the influence of spring 43 or whether it is under the influence of any other means, such as another coil similar to coil 2, is immaterial, since the plunger 22 and rod 29 are mechanically connected. However, in the illustration, spring 43 will yieldably hold the plunger and rod 29 in a position with valve element 28 seated against valve seat 9 after the connected plunger and rod 29 are moved to the left.

When the coil 2 is again energized, the plunger 22 will again move to the right, and in so doing, it will release the rod 29 so the latter may move to the right relative to the plunger 22 under the influence of spring 41 thus projecting element 27 and retracting element 28 so that the parts will again be in the position shown in FIG. 1.

The coil 2 in this arrangement, in conjuction with the springs and rigid stops at the ends of the cylinders, such as the heads respectively forming the bottom of recess 12 and the head 18 of sleeve 4, to effect the relative reciprocable movement between the rod 29 and plunger 22, and the alternate locking and unlocking together of rod 29 and plunger 22 in retracted position of the end 27 of the rod within the plunger.

In FIG. 1 the valve element 27 is seated against the valve seat 20, and it is held in this position by the spring 41, while the spring 43 has yieldably urged the cylinder 22 in a direction projecting out of coil 2 until its flange 42 is against the bottom of the recess 12 in the valve block 10. In this position, it will be seen that the valve element 28 is in open position, hence fluid may flow through the recess from the inlet 13 to the outlet 14, but valve element 27 closes the flow from passageway 19 in through the sleeve 4. Obviously the sleeve 4 may be closed at head 18, if only the valve element 28 is to be used to control the flow of fluid from inlet 13 to outlet 14. From the foregoing structure the operation of the plunger and valve elements is obvious.

FIG. 5 semidiagrammatically illustrates an intermediate position of the cooperatively related parts of the liner cam 37, and cam members 34, 36 in an intermediate position of said parts, but when the valve element 27 is in the closed position seen in FIG. 1 and when element 28 is in an open position.

The liner cam 37 is formed with a pair of relatively wide lands 44 projecting radially inwardly from the liner, and at opposite sides of the latter, thus providing recesses or spaces 45 between the lands (FIG. 4).

The cam member 34, which is rotatable and slidable on rod 29, is formed with four equally spaced ridges 48 that are parallel with lands 44 (FIGS. 2, 4).

Ridges 48 can slide longitudinally of the liner 37 in the spaces between the pair of lands 44, but when positioned outwardly of the ends of the lands 44 that generally face toward the valve seat 9, the ends of the ridges 48 facing in the direction of seat 20 will engage the end edges of the lands 44.

The cam member 36 is formed with a pair of relatively wide ribs 49 (FIGS. 3, 4) that are parallel with and positioned within the spaces between the lands 44 on the liner 37.

Actuating cam surfaces on cam members 34, 36 are on the ends of the ridges 48 that are adjacent to and on the end edges of ribs 49 while the end edges of lands 44 have cam surfaces on the ends toward ridges 48.

The end edge of cam member 36 that faces cam member 34 is formed by adjoining, oppositely slanted pairs of cam surfaces 50, 51 to form axially outwardly directed teeth 52.

The end edge 53 of each rib 48 that faces cam member 36 is slanted to correspond to end surface 51 of each tooth 52.

The end edge of each land 44 that is generally directed toward the valve seat 9, is formed with cam surfaces 54, 54' that correspond in inclination to the surfaces 51, 53, but surface 54 is twice as long as surface 53 on ridge 48 and the surface 53 may be substantially equal in length (circumferentially of the liner) to surface 50 or 51.

Cam members 34, 36 are substantially stationary insofar as their movement longitudinally of the plunger 22 is concerned, and cam member 36 is stationary against rotary movement on rod 29. Any movement of cam members 34, 36 is very slight compared to the movement of cam liner 37.

The plunger 22 and the liner 37 are secured together for movement in one direction as a unit under the influence of the magnetic field of the coil and also move as a unit in the opposite direction when coil 2 is deenergized.

In the intermediate position indicated in FIG. 5, the liner cam 44 has started to move to the right, the coil 2 being energized, and the land 44 is alongside ridges 48 the latter being in the space between cams 44. The end cam surface 53 on the lower of the two ridges 48 as seen in FIG. 5 partially extends over and is yieldably held against an end cam surface 51 of cam member 36. As soon as the end of the liner cam 44 clears the end of ridge 48 (FIG. 6) the latter will slide on the end cam surface 51 of cam member 36 to the adjoining end of the adjacent cam surface 50 where the ridge 48 will extend over the end cam surface 54 of the liner cam 44.

Upon deenergizing the coil and the plunger and liner 37 will move to the left under the influence of the spring 43 (FIG. 1). The ridge 48 will be held on the end of the land 44 (FIGS. 4, 7) and in the reentrant angle between the end surfaces 51, 50 of cam member 36. The spring 41 will be compressed and the valve element 28 is moved to the left relative to the adjacent end of the plunger so that valve element 28 will seat on the valve seat 9 when the plunger is so moved to the left under the influence of spring 43. The valve element 27, will, of course, be in open position when valve element 28 is against seat 9.

Upon the next impulse to the coil 2 the liner cam 44 will again be moved to the right with the plunger until the ridge 48 that was supported against surface 54 of land 44 slides onto surface 54' of land 44 (FIG. 8) and across surface 54' to the position shown in FIG. 9 when spring 41 will again urge the valve element 27 to the position shown in FIG. 1 to engage seat 20, while the valve element 28 will be spaced from seat 9.

As seen in FIG. 9, the next ridge 48 in the series of four ridges, indicated as the lowermost ridge in FIG. 9, will be in a position to be moved to the position shown in FIG. 5, when the circuit is again momentarily closed to coil 2, and the cycle will be repeated with successive impulses.

It is to be understood that various mechanical expedients or modifications of the automatically actuatable mechanism connecting the rod 29 and plunger 22 may be adapted for effecting the relative reciprocable movement between them, as described. The mechanism in itself, i.e., the cam liner, and cam members have been used in different forms in the past in ballpoint pens, hence no claims are made to this mechanism per se.

Also, while valve elements 27 and 28 are illustrated, it is to be seen that the rod 29 may be employed for doing useful work without the valve elements, such as actuating one or more switches, or as a solenoid actuated holding means, etc.

While the foregoing specification sets forth the invention in specifications, it is to be understood that numerous changes to the shape, size and materials may be resorted to without departing from the spirit and scope of the invention as claimed hereinafter.

I claim:

1. In a solenoid actuator that includes an electrically energizable coil and an electro-magnetic plunger reciprocable therein from an outer position when said coil is deenergized to an inner position when said coil is energized and vice versa and means independently of the influence of said coil for moving said plunger from said inner position to said outer position when said coil is deenergized; a member movable with said plunger during movement of the latter to said outer position only upon alternate deenergizing of said coil during successive energizations thereof; means within said plunger connecting said member with said plunger for said movement of said member as a unit with said plunger during movement of said plunger from said inner position to said outer position thereof; and means actuated by movement of said plunger from said inner position to said outer position alternately in a succession of reciprocable movements of said plunger by intermittent energizations of said coil for holding said member against movement with said plunger from said outer position to said inner position independently of said coil.

2. In a solenoid actuator that includes an electrically energizable coil and an electro-magnetic plunger reciprocable therein from an outer position when said coil is deenergized to an inner position when said coil is energized; means independently of the influence of said coil for moving said plunger from said inner position to said outer position when said coil is deenergized; a member connected with said plunger for movement therewith from said outer position to said inner position; means carried by said member and said plunger and automatically actuated by movement of said plunger and member to said inner position for releasing said member from its operative connection with said plunger and for holding said member against return movement of said member with said plunger to said outer position upon alternate deenergizations of said coil.

3. In a solenoid actuator that includes an electrically energizable coil and an electro-magnetic plunger reciprocable therein from an outer position when said coil is deenergized to an inner position when said coil is energized; means independently of the influence of said coil for moving said plunger from said inner position to said outer position when said coil is deenergized; a member connected with said plunger for movement therewith from said outer position to said inner position; means carried by said member and said plunger and automatically actuated by movement of said plunger and member to said inner position for releasing said member from its operative connection with said plunger and for holding said member against return movement of said member with said plunger to said outer position upon alternate deenergizations of said coil, and means actuated by movement of said plunger from said outer position to said inner position upon each energization of said coil immediately following each of said alternate energizations there of for automatically connecting said member with said plunger for movement of said member with said plunger to said outer position upon one of said alternate energizations of said coil.

4. In a solenoid actuator that includes an electrically energizable coil and an electro-magnetic plunger reciprocable therein from an outer position when said coil is deenergized to an inner position when said coil is energized and vice versa and means independently of the influence of said coil for moving said plunger from said inner position to said outer position when said coil is deenergized; a member within said plunger movable therewith during movement of the latter to said outer position upon alternate deenergizing of said coil; means respectively carried by said member and said plunger for holding said member independently of energization of said coil against movement thereof from said inner position to said outer position between each of said alternate deenergizations of said coil.

5. In a solenoid actuator that includes an electrically energizable coil and an electro-magnetic plunger reciprocable therein from an outer position when said coil is deenergized to an inner position when said coil is energized and vice versa and means independently of the influence of said coil for moving said plunger from said inner position to said outer position when said coil is deenergized; a member within said plunger movable therewith during movement of the latter to said outer position upon alternate deenergizing of said coil; means respectively carried by said member and said plunger for holding said member independently of energization of said coil against movement thereof from said inner position to said outer position between each of said alternate deenergizations of said coil, said member being tubular, said last-mentioned means including spring within said plunger reacting between said member and said plunger.

6. In a solenoid valve assembly that includes an electrically energizable coil and an electro-magnetic plunger reciprocable therein from an outer position when said coil is deenergized to an inner position when said coil is energized and vice versa and means independently of the influence of said coil for moving said plunger from said inner position to said outer position when said coil is deenergized; a valve seat in said assembly stationary relative to said plunger, a valve element in said assembly movable relative to said plunger and said seat between two positions one being a closed position in which it is seated against said seat and the other being an open position in which it is spaced from said seat; concentrically arranged coaxial connecting; means respectively carried by said valve member and said plunger and connecting said valve element with said plunger for movement therewith and to one of said two positions when said coil is energized, and yieldable means independently of said coil actuated by movement of said plunger upon said energizing thereof for yieldably and releasably holding said valve element in said last-mentioned one of two positions when said plunger is deenergized.

7. In a solenoid actuated valve that includes an electrically energizable coil and an electro-magnetic plunger reciprocable therein from an inner position when said coil is energized to an outer position when said coil is deenergized, and vice versa and means independently of the influence of said coil for moving said plunger to said outer position when said coil is deenergized; a valve seat at one end of said plunger and a stop means at the opposite end of said plunger stationary relative to each other and spaced apart a greater distance than the length of said plunger; a valve assembly including an elongated member coaxial with said plunger reciprocable therein and having a valve element on the end thereof that is adjacent to said valve seat, said element and the opposite end of said member being adapted to alternately engage said seat and then said stop means only upon every second reciprocation of said member; means independently of the influence of said coil for yieldably holding said member in a position in which said valve element is in engagement with said valve seat only upon every second deenergization of said coil, and means connecting said member with said plunger upon each energization of said coil immediately following each of said alternate deenergizations thereof for moving said element away from said seat and into engagement with said stop member.

References Cited in the file of this patent
UNITED STATES PATENTS

| | | |
|---|---|---|
| 802,958 | Waterman | Oct. 24, 1905 |
| 1,856,350 | Metcalf | May 3, 1932 |
| 2,111,232 | Wetzel | Mar. 15, 1938 |
| 2,651,744 | Acklin | Sept. 8, 1953 |
| 2,887,883 | Zipper | May 26, 1959 |
| 3,101,434 | Kitscha | Aug. 20, 1963 |